United States Patent
Shin et al.

(10) Patent No.: US 7,383,112 B2
(45) Date of Patent: Jun. 3, 2008

(54) METHOD AND SYSTEM FOR ADAPTIVELY COMPENSATING OPEN LOOP FRONT-WHEEL STEERING CONTROL

(75) Inventors: Kwang-Keun Shin, Rochester Hills, MI (US); Shih-Ken Chen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 274 days.

(21) Appl. No.: 11/372,719

(22) Filed: Mar. 10, 2006

(65) Prior Publication Data

US 2007/0213901 A1    Sep. 13, 2007

(51) Int. Cl.
*B62D 6/00* (2006.01)
(52) U.S. Cl. .......................... 701/41; 701/42; 280/5.51
(58) Field of Classification Search ............ 701/41–43; 280/5.51
See application file for complete search history.

(56) References Cited

U.S. PATENT DOCUMENTS

| | | | |
|---|---|---|---|
| 6,862,506 B2 * | 3/2005 | Boswell et al. | 701/41 |
| 6,892,123 B2 * | 5/2005 | Hac | 701/48 |
| 2005/0278077 A1 | 12/2005 | Shin et al. | |
| 2006/0020382 A1 | 1/2006 | Shin et al. | |

* cited by examiner

*Primary Examiner*—Richard M. Camby

(57) ABSTRACT

An active front-wheel vehicle steering control system that employs open-loop control that includes an adaptive compensation sub-system that compensate for changes in vehicle dynamic parameters. The control system includes a dynamic parameter estimation sub-system that provides an estimated understeer coefficient based on a front-wheel steering angle signal, a vehicle lateral acceleration signal, a vehicle yaw rate signal and a vehicle speed signal. An open-loop control sub-system generates a steering angle control signal for controlling steering of the front wheels using a combination of a nominal open-loop steering angle control signal and a corrected open-loop steering angle control signal that is based on a real-time estimated understeer coefficient.

9 Claims, 3 Drawing Sheets

METHOD AND SYSTEM FOR ADAPTIVELY COMPENSATING OPEN LOOP FRONT-WHEEL STEERING CONTROL

TECHNICAL FIELD

This invention relates generally to open-loop control for active vehicle front-wheel steering and, more particularly, to open-loop control for active front-wheel steering that employs vehicle parameter estimates to compensate for changes in vehicle parameters.

BACKGROUND OF THE INVENTION

Open-loop front-wheel steering provides a certain amount of front-wheel steering assist depending on the amount of front-wheel steering provided by the vehicle operator. Closed-loop front-wheel steering provides feedback in the event that the vehicle is not following the steering path commanded by the vehicle operator. For example, slippery road conditions may prevent the vehicle from turning in the desired direction because the wheels may slip along the road surface. Further, the vehicle's rear quarter may "fish-tail," also providing a different turn angle than was intended. Closed-loop front-wheel steering assist systems sense the actual vehicle yaw rate and the commanded yaw rate, and generate a gain signal that provides the steering assist by the front wheels if the vehicle yaw rate and the commanded yaw rate are not the same. In these types of active front-wheel steering control systems, the open-loop control is always active and the closed-loop control is only activated if enhanced handling and stability are desired.

Vehicles are designed so that the vehicle handling response complies with certain design specifications. Vehicle dynamic parameters define the vehicle handling response, where nominal parameters define a nominal vehicle handling response. The vehicle dynamic parameter of understeer coefficient is the most dominant vehicle dynamic parameter used in an open-loop control system for determining the stability and dynamic handling behavior of a vehicle. The understeer coefficient defines the vehicle yaw rate or turning radius for a particular steering angle. This parameter varies according to different vehicle loading, tire pressure, tire wear, and vehicle-to-vehicle variations of suspension characteristics, etc.

The control gains for front-wheel steering control systems, including both open-loop and closed-loop control, are optimally determined based on "out-of-factory" vehicle dynamic parameters. During operation of the vehicle over its lifetime, however, the factory-tuned vehicle parameters change as a result of short-term vehicle variations, such as vehicle loading and tire pressure changes, and long-term variations, such as tire wear and vehicle suspension age. When the vehicle dynamic parameters change from their original settings, the original steering control gains are no longer optimal, resulting in a different vehicle handling feel and vehicle stability degradation.

U.S. patent application Ser. No. 10/863,956, titled Real-Time Vehicle Dynamics Estimation System, filed Jun. 9, 2004, assigned to the assignee of this application and herein incorporated by reference, discloses a system that determines vehicle parameter estimates as a vehicle ages. It would be desirable to use such estimated dynamic parameters in an open-loop front-wheel active steering system to improve the open-loop steering gain as the vehicle ages and is subjected to different conditions. By modifying the open-loop gain schedule in response to estimated vehicle dynamic parameters, the handling feel and directional stability of the original vehicle can be maintained over the lifetime of the vehicle.

SUMMARY OF THE INVENTION

In accordance with the teachings of the present invention, an active front-wheel vehicle steering control method and system is disclosed that employs open-loop control that includes an adaptive compensation sub-system that compensates for changes in vehicle dynamic parameters. A dynamic parameter estimation sub-system provides an estimated understeer coefficient based on a front-wheel steering angle signal, a vehicle lateral acceleration signal, a vehicle yaw rate signal and a vehicle speed signal. An open-loop control sub-system generates a steering angle control signal for controlling the steering of the front wheels using a combination of a nominal open-loop control signal and a corrected open-loop control signal that is based on a real-time estimated understeer coefficient.

Additional advantages and features of the present invention will become apparent from the following description and appended claims, taken in conjunction with the accompanying drawings.

DETAILED DESCRIPTION OF THE INVENTION

The following discussion of the embodiments of the invention directed to an active front-wheel steering system employing compensation for changes in vehicle dynamics parameters is merely exemplary in nature, and is in no way intended to limit the invention or its applications or uses.

Figure 1:
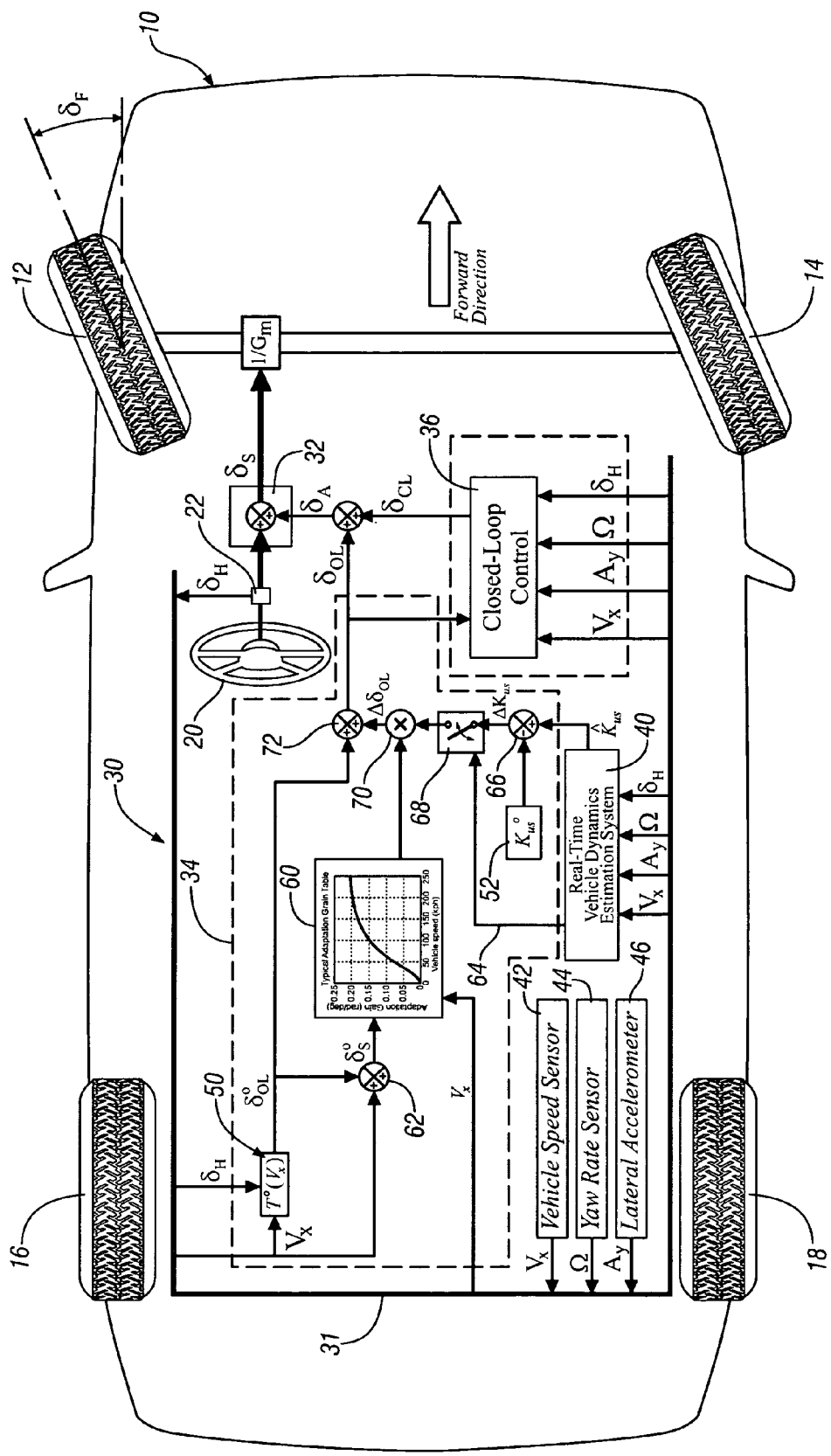
FIG. 1 is a schematic block diagram of a front-wheel steering control system employing estimated vehicle dynamic parameters, according to an embodiment of the present invention.

FIG. 1 is a plan view of a vehicle 10 including front wheels 12 and 14 and rear wheels 16 and 18. The front wheels 12 and 14 are steered by a vehicle steering wheel 20. A steering angle sensor 22 measures the steering angle of the steering wheel 20 and provides a steering wheel angle signal $\delta_H$. The vehicle 10 includes an active front-wheel steering control system 30 that generates a steering control signal $\delta_A$ that is applied to a front-wheel steering actuator 32. The front-wheel steering actuator 32 then adds the steering wheel angle signal $\delta_H$ to steer the front wheels 12 and 14, as will be discussed in detail below.

The control system 30 includes an open-loop control sub-system 34 that provides an open-loop steering control signal $\delta_{OL}$ and a closed-loop control sub-system 36 that provides a closed-loop steering control signal $\delta_{CL}$. The control system 30 also includes a real-time vehicle dynamics estimation sub-system 40 that estimates the understeer coefficient $K_{US}$. In one embodiment, the dynamics estimation sub-system 40 is a real-time vehicle dynamics estimation system known in the art that employs a vehicle parameter estimator, a vehicle condition detector and a rich steering input detector for generating an estimated vehicle understeer coefficient and front and rear cornering compliances in real time based on various vehicle signals upon detecting the vehicle operating in a linear region. Alternatively, other real-time vehicle dynamics estimation systems may also be applicable.

A signal bus 31 delivers various sensor signals including the steering wheel angle signal $\delta_H$, a vehicle speed signal Vx, a vehicle yaw rate signal $\Omega$ and a vehicle lateral acceleration signal Ay to each subsystem. The control system 30 also includes a vehicle speed sensor 42 that provides the vehicle speed signal Vx to all of the open-loop control sub-system 34, the closed-loop control sub-system 36 and the dynamics estimation sub-system 40. The open-loop control sub-system 34, the closed-loop control sub-system 36 and the dynamics estimation sub-system 40 also receive the steering wheel angle signal $\delta_H$. The closed-loop control sub-system 36 and the dynamics estimation sub-system 40 both receive a vehicle yaw rate signal $\Omega$ and a vehicle lateral acceleration (side-slip) signal Ay from a suitable yaw rate sensor 44 and a lateral acceleration sensor 46, respectively.

The closed-loop sub-system 36 receives the various sensor signals discussed above and generates the closed-loop steering angle $\delta_{CL}$. A closed-loop sub-system that performs these functions is known in the art, and a detailed discussion of its operation is not necessary for a proper understanding of the invention. The closed-loop sub-system 36 is mainly used for stability. For normal and non-aggressive driving on a high-friction surface, the closed-loop sub-system 36 is deactivated to minimize intrusion to the driver.

Figure 2:
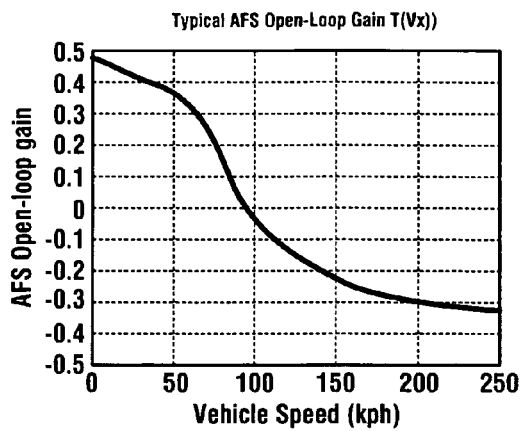
FIG. 2 is a graph with vehicle speed on the horizontal axis and active front steering (AFS) open-loop gain on the vertical axis showing a typical open-loop gain table.

When the closed-loop control is not activated, the relationship between the steering wheel angle $\square_H$ to the front-wheel angle $\square_F$ is represented as:

$$\delta_F = \frac{1 + T(V_x)}{G_m} \delta_H \quad (1)$$

where $T(V_x)$ is a typical open-loop gain table 50 as further illustrated graphically in FIG. 2. Equation (1) can be simplified by introducing equivalent variable gear-reduction ratio (VGR), $G_V(V_x)$, i.e.

$$\delta_F = \frac{1}{G_V(V_x)} \delta_H, \text{ where } G_V(V_x) = \frac{G_m}{1 + T(V_x)} \quad (2)$$

Figure 3:
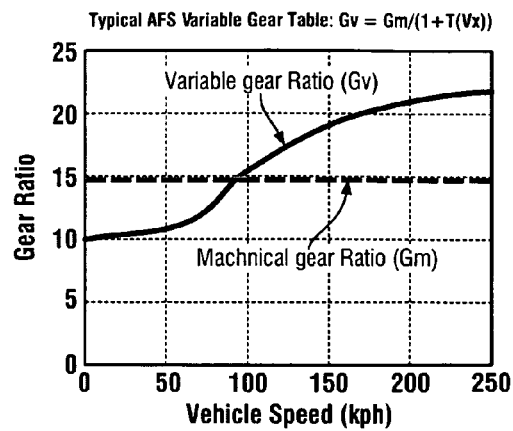
FIG. 3 is a graph with vehicle speed on the horizontal axis and effective gear ratio on the vertical axis showing a typical AFS variable gear-reduction ratio (VGR) table.

FIG. 3 shows the corresponding AFS VGR table. A desired variable gear ratio $G_V(V_x)$ can be achieved by adjusting the open-loop gain table $T(V_x)$. The variable gear ratio is designed to achieve enhanced maneuverability at the low speed range and enhanced stability at the high speed range. The steady-state steering sensitivity $S(V_x)$ is written as:

$$S(V_x) = \frac{\Delta(A_y/g)}{\Delta(\delta_H/G_m)} = \frac{V_x^2}{(K_{us}V_x^2 + Lg)}\{1 + T(V_x)\} \quad (3)$$

where $A_y$, g, $K_{us}$ and L are vehicle lateral acceleration, gravitational acceleration, vehicle understeer coefficient, and wheel base, respectively.

The original open-loop gain table is defined as $T^o(V_x)$, and the original vehicle understeer coefficient is defined as $K_{us}^o$. Therefore the original steering sensitivity $S^o(V_x)$ is written as:

$$S^o(V_x) = \frac{V_x^2}{(K_{us}^o V_x^2 + Lg)}\{1 + T^o(V_x)\} \quad (4)$$

Figure 4:
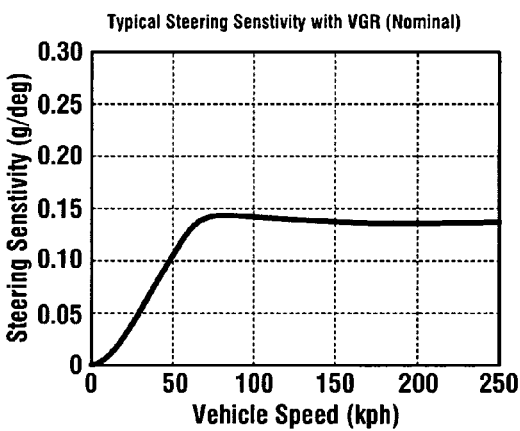
FIG. 4 is a graph with vehicle speed on the horizontal axis and steering sensitivity on the vertical axis showing steering sensitivity of a typical VGR system.
Figure 5:
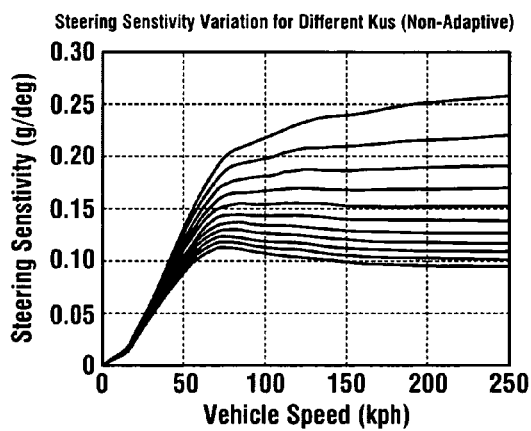
FIG. 5 is a graph with vehicle speed on the horizontal axis and steering sensitivity on the vertical axis showing steering sensitivity for different understeer variations.

FIG. 4 shows the original steering sensitivity of a typical VGR system. When there is a vehicle parameter change, the steering sensitivity of the VGR system changes according to the vehicle parameter variation. FIG. 5 shows the variation of steering sensitivity for different understeer variations. To preserve the originally designed steering sensitivity in the presence of the vehicle parameter variations, the open-loop gain table should be modified accordingly. The new understeer coefficient is defined as $K_{us}$ and the corresponding new gain table is defined as $T(V_x)$. The variation of the steering sensitivity, around the original settings and with respect to the parameter and the steering gain variation, is then written as:

$$\Delta S = \frac{\partial S}{\partial K_{us}}\bigg|_o \Delta K_{us} + \frac{\partial S}{\partial T}\bigg|_o \Delta T(V_x) \quad (5)$$

$$= -\frac{V_x^2\{1 + T^o(V_x)\}V_x^2}{(K_{us}^o V_x^2 + Lg)^2}\Delta K_{us} + \frac{V_x^2}{(K_{us}^o V_x^2 + Lg)}\Delta T(V_x)$$

where $\Delta K_{us} = K_{us} - K_{us}^o$ and $\Delta T(V_x) = T(V_x) - T^o(V_x)$.

To maintain the same steering sensitivity, therefore, the variation of the steering sensitivity should be zero resulting in:

$$\Delta T(V_x) = \frac{\{1 + T^o(V_x)\}V_x^2}{(K_{us}^o V_x^2 + Lg)} \Delta K_{us} \qquad (6)$$

The new open-loop gain table is then expressed as:

$$T(V_x) = T^o(V_x) + \Delta T(V_x) = T^o(V_x) + \frac{\{1 + T^o(V_x)\}V_x^2}{(K_{us}^o V_x^2 + Lg)} \Delta K_{us}. \qquad (7)$$

Figure 6:
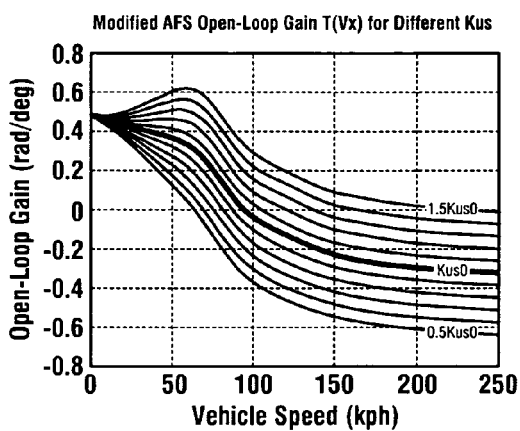
FIG. 6 is a graph with vehicle speed on the horizontal axis and open-loop gain on the vertical axis showing a modified open-loop gain table for different variations of vehicle understeer.
Figure 7:
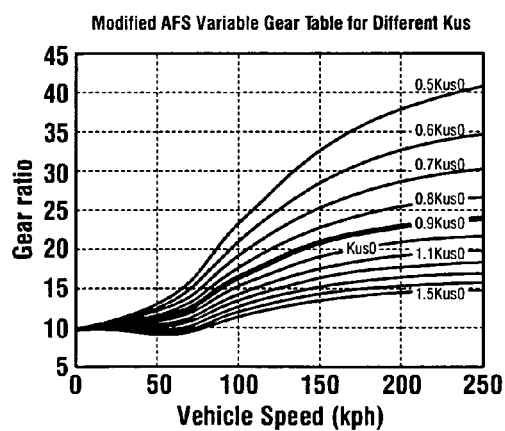
FIG. 7 is a graph with vehicle speed on the horizontal axis and effective gear ratio on the vertical axis showing a modified VGR for different variations of vehicle understeer.

Therefore, when the vehicle understeer coefficient deviates from the original value, the open-loop gain table should be modified accordingly, to maintain the original steering sensitivity. FIG. 6 shows the modified open-loop gain table for different variations of vehicle understeer. FIG. 7 also shows the corresponding modified VGR for different variations of vehicle understeer. The corresponding open-loop angle is then:

$$\delta_{OL} = T(V_x)\delta_H = T^o(V_x)\delta_H + \frac{\Delta K_{us} V_x^2}{(K_{us}^o V_x^2 + Lg)} \{\delta_H + T^o(V_x)\delta_H\}. \qquad (8)$$

For notational simplicity, the adaptation gain $G_{Adapt}$ can be defined as:

$$G_{Adapt} = \frac{V_x^2}{(K_{us}^o V_x^2 + Lg)} \qquad (9)$$

Figure 8:
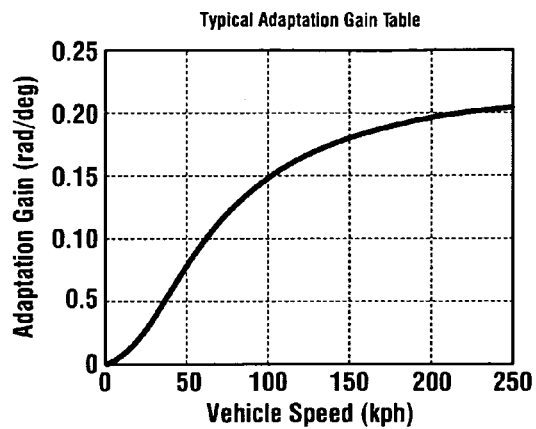
FIG. 8 is a graph with vehicle speed on the horizontal axis and adaptation gain on the vertical axis showing an adaptation gain table according to the present invention.

FIG. 8 shows the adaptation gain table 60 calculated according to the original vehicle understeer and equation (9). Therefore once the vehicle understeer deviation from the original value is known or estimated, the open-loop AFS control can be corrected by using equation (8) and (9). By doing this, the deviated steering sensitivities shown in FIG. 5 can be recovered to the original one in FIG. 4.

Returning now to FIG. 1, the implementation of the adaptive compensation of the present invention will be described further. First, the measured steering wheel angle $\delta_H$ and the nominal open-loop angle $\delta^o{}_{OL}$ are added together via an adder 62. The output of the adder 62 is a nominal resultant open-loop steering angle $\delta^o{}_S$ that is then amplified by the adaptation gain, which is generated by the adaptation gain table 60 and the vehicle speed. The amplified value and the change in the understeer coefficient $\Delta K_{US}$ are multiplied via the multiplier 70 to generate the corrective angle $\Delta\delta_{OL}$. At the same time, the dynamics estimation sub-system 40 produces the vehicle understeer estimation $\hat{K}_{us}$ with the estimation ready flag 64. Next, the vehicle understeer estimation $\hat{K}_{us}$ is applied to a subtractor 66 where it is coupled to the nominal understeer coefficient $K_{us}{}^o$ 52 that is the original "factory-tuned" understeer coefficient. The output of the subtractor 66 is the change in the understeer coefficient $\Delta K_{US}$, which is sent to the multiplier 70 when an enable/disable switch 68 is closed due to the estimation ready flag 64 being set. The resultant signal of the multiplier 70 is a corrective angle signal $\Delta\delta_{OL}$. By adding the corrective angle $\Delta\delta_{OL}$ to the nominal open-loop angle $\delta^o{}_{OL}$ via an adder 72, the modified open-loop control angle $\delta_{OL}$ is generated. Thus, the open-loop control angle $\delta_{OL}$ can be approximated as:

$$\delta_{OL} = T(V_x)\delta_H = T^o(V_x)\delta_H + G_{Adapt}(V_x)\{\delta_H + T^o(V_x)\delta_H\}(\hat{K}_{us} - K_{us}{}^o). \qquad (10)$$

Figure 9:
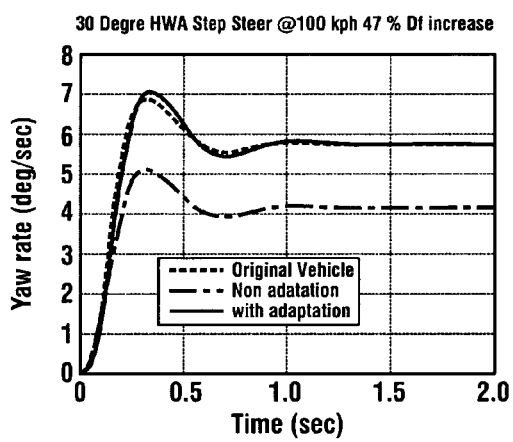
FIG. 9 is a graph with time on the horizontal axis and yaw rate on the vertical axis showing the comparison of the yaw-rate response of a vehicle with and without using the system of the present invention.
Figure 10:
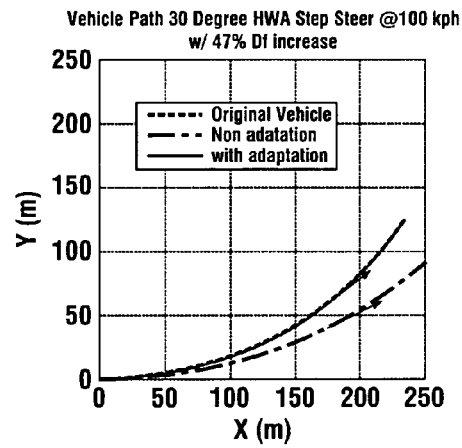
FIG. 10 is a graph with distance on both the horizontal and vertical axis showing how the system of the present invention follows a desired vehicle path while the system without the invention cannot, in the presence of vehicle parameter deviations.

FIGS. 9 and 10 show an example simulation result of step steering at 100 kph with significantly increased front cornering compliance. In this case the driver does not compensate for the yaw-rate error. FIG. 9 shows the yaw-rate response of the vehicle. For original configuration, the yaw-rate response is as shown with the dotted line. When the front cornering compliance increases by 47% from the original value and the adaptive compensation is not applied, the yaw-rate response is as shown with the dash-dot line. Since the front cornering compliance increases, the vehicle becomes more understeer resulting in much smaller yaw-rate response. When this invention of the adaptive compensation is applied, the yaw rate is compensated close to the original yaw rate, as shown with the solid line.

FIG. 10 shows that under the condition of compliance changes, the desired vehicle path will deviate from the original desired path without adaptation. With adaptation, the path can be maintained.

Figure 11:
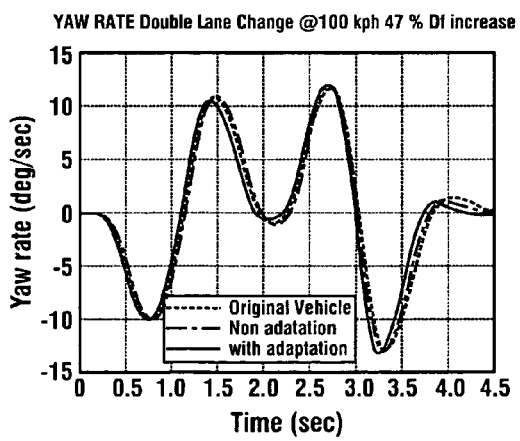
FIG. 11 is a graph with time on the horizontal axis and yaw rate on the vertical axis showing the yaw-rate response of a vehicle with and without using the system of the present invention.
Figure 12:
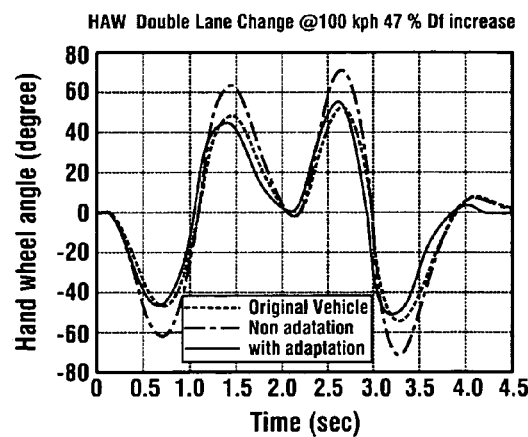
FIG. 12 is a graph with time on the horizontal axis and hand wheel angle on the vertical axis showing a driver's hand-wheel angle with and without use of the system of the present invention.

FIGS. 11 and 12 show the simulation result of double-lane-change maneuver at 100 kph with significantly increased front cornering compliance. FIG. 13 shows the yaw-rate response of the vehicle. Since the driver can still compensate for the yaw-rate error, the yaw rates of the three cases (original, non adaptation, with adaptation) are very close to each other.

FIG. 12 shows the driver's hand-wheel angle. The original hand-wheel angle is indicated with the dotted line. When the front cornering compliance increases by 47% from the original value without applying the adaptation algorithm from this invention, the hand-wheel angle is indicated with the dash-dotted line. Since the vehicle understeer coefficient is changed, the driver applies more steering action to achieve the similar amount of yaw rate. When the adaptation is applied, however, the hand-wheel angle indicated with the solid line becomes very close to the original hand-wheel angle without the compliance change. This implies that the steering sensitivity is recovered as desired.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. Open-loop control system providing a steering control signal to front wheels of a vehicle, said system comprising:
   a vehicle dynamics parameter estimation sub-system providing a difference signal indicative of change between estimated and nominal vehicle dynamics parameters; and
   an open loop adaptive compensation sub-system providing
      a nominal steering angle signal,
      a corrected steering angle signal based on the difference signal; and
   said steering control signal based on the nominal steering angle signal and the corrected steering angle signal.

2. A control system for providing active front-wheel steering for a vehicle, said system comprising:
   a vehicle dynamics parameter estimation sub-system responsive to input signals, said vehicle dynamics parameter estimation sub-system employing a parameter estimation algorithm for estimating vehicle parameters based on the input signals, said vehicle dynamics parameter estimation sub-system comparing the estimated vehicle parameters with nominal vehicle parameters and generating a difference signal indicative of the change between the estimated vehicle dynamics parameters and the nominal vehicle dynamic parameters; and an open-loop control sub-system for generating an open-loop steering control signal to the front wheels of the vehicle, said open-loop control sub-system being responsive to a vehicle speed signal, a steering wheel angle signal and the difference signal, said open-loop control sub-system including an open-loop look-up table for generating a nominal open-loop steering signal based on the vehicle speed signal, said open-loop control sub-system further including an open-loop adaptive compensation sub-system for generating a corrected open-loop steering angle signal based on the steering wheel angle signal, the vehicle speed signal and the difference signal, said open-loop steering control signal comprising a combination of the nominal open-loop steering angle signal and the corrected open-loop steering angle signal.

3. The system according to claim 2 wherein the open-loop adaptive compensation sub-system generates the corrected open-loop steering angle signal by multiplying the difference signal by an amplification of the nominal open-loop steering angle, wherein the amplification is determined based on the vehicle speed signal.

4. The system according to claim 3 wherein the vehicle dynamics parameter estimation sub-system receives a steering wheel angle signal, a vehicle lateral acceleration signal, a vehicle yaw rate signal and the vehicle speed signal as the input signals and generates a change in understeer coefficient as the difference signal.

5. The system according to claim 4 wherein the open-loop adaptive compensation process sub-system generates the corrected open-loop steering value by:

$$\Delta\delta_{OL}=G_{Adapt}(V_x)\{\delta_H+T^o(V_x)\delta_H\}(\hat{K}_{us}-K_{us}^o)$$

where, $$G_{Adapt} = \frac{V_x^2}{(K_{us}^o V_x^2 + Lg)};$$

$K_{us}^o$ is an original vehicle understeer coefficient;
$V_x$ is a vehicle speed;
L is a vehicle wheel base;
g is a constant of gravity;
$\delta_H$ is a steering wheel angle;

$T^o(V_x)$ is an original open loop gain; and
$\hat{K}_{us}$ is real-time estimated vehicle understeer coefficient.

6. Method for providing active front-wheel steering for a vehicle, the method comprising:

receiving vehicle input signals, including a vehicle speed signal and a steering wheel angle signal;

estimating vehicle parameters based on the input signals;

comparing the estimated vehicle parameters with nominal vehicle parameters and generating a difference signal indicative of the change between the estimated vehicle dynamics parameters and the nominal vehicle dynamic parameters;

generating a nominal open-loop steering signal based on the vehicle speed signal and the steering wheel angle signal;

generating a corrected open-loop steering angle signal based on the steering wheel angle signal, the vehicle speed signal and the difference signal; and generating an open-loop steering control signal to the front wheels of the vehicle based on the nominal open-loop steering signal and the corrected open-loop steering angle signal.

7. The method according to claim 6 wherein generating the corrected open-loop steering signal includes multiplying the difference signal by an amplification of the nominal open-loop steering angle, wherein the amplification is determined based on the vehicle speed signal.

8. The method according to claim 7 wherein the nominal vehicle dynamic parameters includes a nominal vehicle understeer coefficient, and wherein estimating the vehicle parameters includes estimating a real-time vehicle understeer coefficient, and wherein generating the difference signal includes determining a difference between the nominal vehicle understeer coefficient and the real-time estimated vehicle understeer coefficient.

9. The method according to claim 8 wherein generating the corrected open-loop steering value is determined by:

$$\Delta\delta_{OL}=G_{Adapt}(V_x)\{\delta_H+T^o(V_x)\delta_H\}(\hat{K}_{us}-K_{us}^o)$$

where, $$G_{Adapt} = \frac{V_x^2}{(K_{us}^o V_x^2 + Lg)};$$

$K_{us}^o$ is an original vehicle understeer coefficient;
$V_x$ is a vehicle speed;
L is a vehicle wheel base;
g is a constant of gravity;
$\delta_H$ is a steering wheel angle;
$T^o(V_x)$ is an original open loop gain; and
$\hat{K}_{us}$ is a real-time estimated vehicle understeer coefficient.

* * * * *